June 6, 1939.  C. E. MILLER  2,161,548
THREADING MECHANISM
Filed June 7, 1937  2 Sheets-Sheet 1
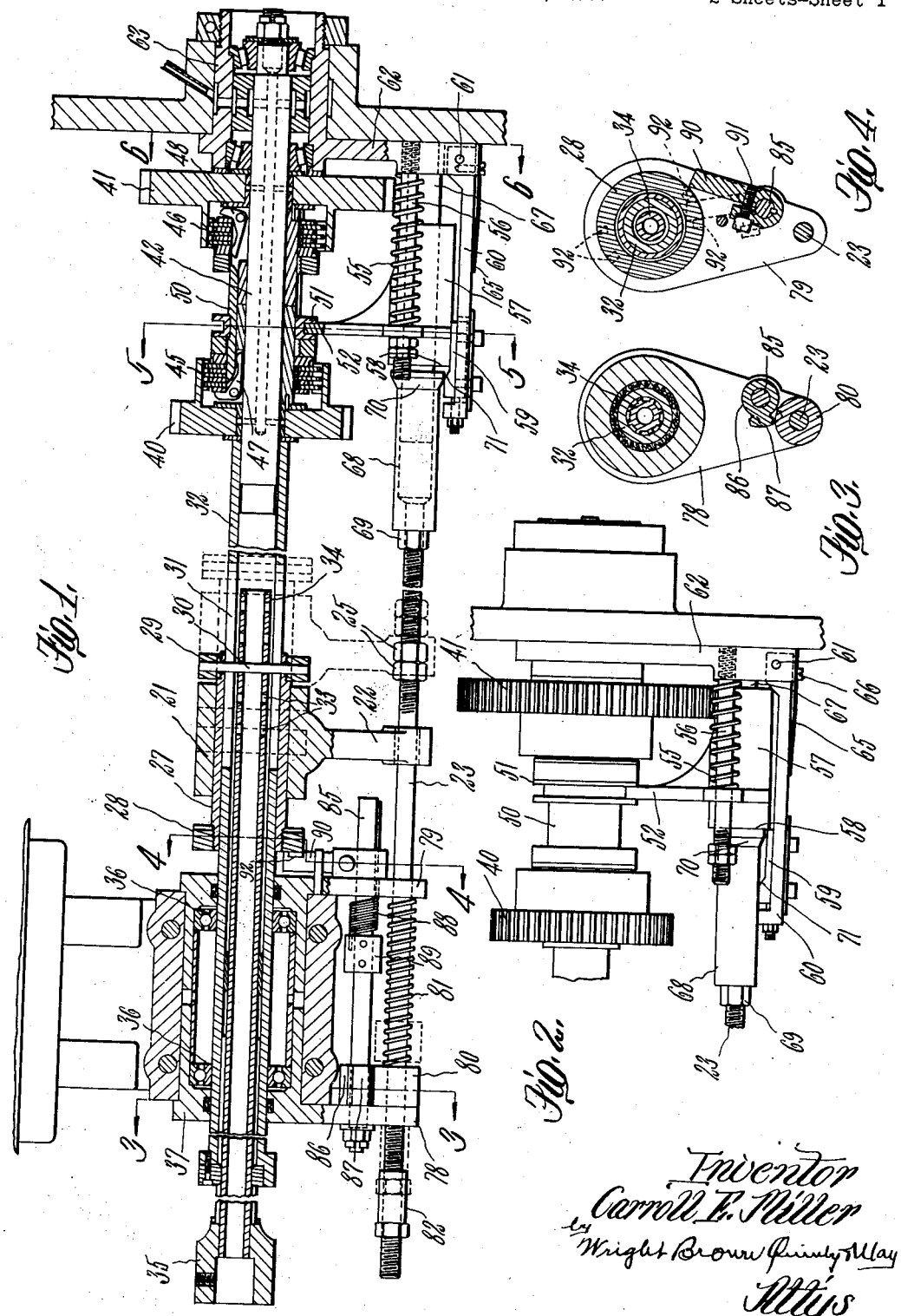
Inventor
Carroll E. Miller
by Wright Brown Quinby & May
Attys June 6, 1939. C. E. MILLER 2,161,548
THREADING MECHANISM
Filed June 7, 1937 2 Sheets-Sheet 2
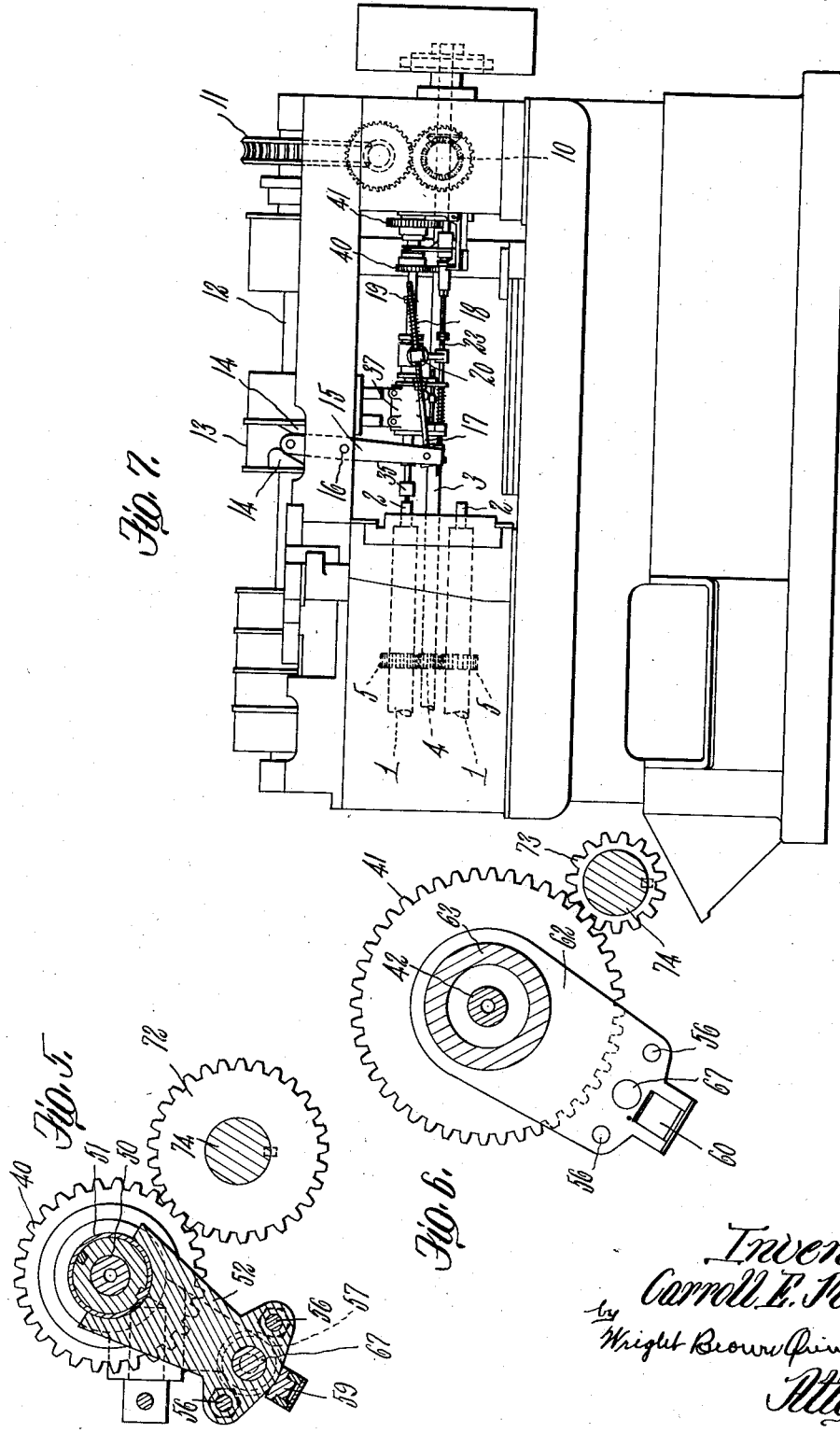
Inventor
Carroll E. Miller
by Wright Brown Quinby May
Attys Patented June 6, 1939

2,161,548

UNITED STATES PATENT OFFICE 2,161,548

THREADING MECHANISM

Carroll E. Miller, Windsor, Vt., assignor to Cone Automatic Machine Company Inc., Windsor, Vt., a corporation of Vermont Application June 7, 1937, Serial No. 146,774

3 Claims. (Cl. 29—57)

This invention relates to threading mechanism of a type intended to be used with rotating work, and while not restricted to such use is particularly applicable as an attachment for multiple spindle automatic lathes where it is desired to cut threads at one or more of the tooling stations. Since the work is rotated in such a machine, the threading tool may be rotated alternately at two different speeds, one higher and the other lower than the speed of rotation of the work in order to effect threading and retracting motions of the threading tool, this arangement providing for reversed directions of relative rotation between the work and the tool.

This invention further provides improved means by which the high and low speed driving connections to the tool are selected. For this purpose there is provided a latch mechanism tripped after the threading tool has acted upon the work for the desired length to change to the tool-withdrawal speed, together with means for resetting the parts to threading speed positions for the start of a succeeding threading operation.

For a more complete understanding of this invention, reference may be had to the accompanying drawings illustrating a tapping mechanism and in which Figure 1 is a fragmentary view partly in section and partly in elevation showing an embodiment of this invention as applied to an automatic lathe.

Figure 2 is a side elevation of a portion of the mechanism shown in Figue 1.

Figures 3 to 6, inclusive, are detail sections on the correspondingly numbered section lines of Figure 1.

Figure 7 is a somewhat diagrammatic front elevation of the lathe showing the mechanism applied thereto.

Referring more particularly first to Figure 7, there is indicated a multiple spindle automatic lathe having a plurality of rotary work spindles shown at 1 for holding work, such as 2. The automatic lathe shown is of a well known type in which the work spindles are carried in a drum which is indexed to bring the tool holders in succession into various angular positions at which certain tooling operations are performed thereon. The tapping mechanism of this invention is designed to tap the work at one of these stations, herein shown in Figure 7 as one of the two upper stations. The individual work spindles are rotated as from a central drive shaft 3 which has connections through the intermeshing gears 4 and 5 with the work spindles. This shaft is also connected through a suitable train of gearing indicated at 10 with a worm wheel 11 on a cam shaft 12. This cam shaft has thereon various cam drums for controlling the various operations of the machine, and one of these, as at 13, has cam elements 14 thereon for moving the upper end of a lever 15 pivoted at 16, and the lower end of which is connected to a pull rod 17 to bring the tapping mechanism up to the work to start the tapping operation. As soon as the tap takes hold, its engagement with the work moves the tap forward independently of the cam until it reaches the desired depth in the work when it is automatically withdrawn as will be explained. This pull rod 17 acts through a coil spring 18 thereon reacting between check nuts 19 and a head 20 through which the rod passes, to a slide 21 shown to a larger scale in Figure 1. This slide 21 has an extension 22 slidable on a rod 23 which is threaded for a portion of its length and carries on the threaded portion an adjusting and a lock nut 25 which form an abutment against which the extension 22 may engage to move the rod 23 axially at certain times as will later appear to operate the latch mechanism to which reference has been made.

The slide 21 is fixed to a sleeve 27 having threaded extremities, one of which carries an internally threaded collar 28, and the other of which carries a similar collar 29. The collar 29 is bridged by a pin 30 which passes through an elongated slot 31 in a hollow shaft 32 and also may be placed through any selected of opposed holes 33 in a shaft or sleeve 34 arranged telescopically within and concentric to the shaft 32 so as to adjust the axial relation of the parts 32 and 34 while maintaining them keyed for simultaneous rotation. Thus as the collar 29 is moved axially along the shaft 32, it carries the sleeve 34 with it. The outer end of the sleeve 34 carries a tap-receiving socket 35 within which the threading tap may be secured by any suitable means, as, for example, a set screw.

The shaft 32 is rotatable within bearings 36 in a head 37 which is arranged to be mounted in fixed position on the machine by any suitable means. Mechanism for driving the shaft 32 at either of two speeds, one higher and the other lower than that of the work spindle, comprises the relatively small or high speed gear 40 and the relatively large or low speed gear 41, these two gears being journaled on a shaft 42 to which the rear end of the hollow shaft 32 is secured. Either of these gears 40 or 41 may be clutched to the shaft 42, as by ring clutches 45 and 46, respectively, there being for each of these clutches a series of actuating fingers 47 and 48, only one set of which may be thrust into clutching relation at one time, and the control therefor being through a slidable sleeve 50 having wedge extremities for engagement with the actuating ends of the levers 47 or 48 of each set. A grooved collar 51 may be employed to shift the sleeve 50 axially and in engagement therewith may be arranged a shifter arm 52. This shifter arm 52 is normally held in one axial position, as shown with the high speed gear 40 in driving relation to the threading tool, as by means of springs 55, which surround guide posts 56, fixed at one end to the machine frame and which pass through an opening in the shifter arm 52.

The shifter arm 52 may, however, be held latched in another axial position with the low speed gear 41 in driving relation to the threading tool. To this end, a sleeve 57 is carried by or fixed to the shifter arm 52 and this presents a shoulder 58 at its forward end, which, when the arm 52 has been moved into the right hand position shown in Figure 2 with the low speed gear 41 in driving relation to the tool, may be caught by a latch block 59. This block is adjustably secured to a latch arm 60 which is fulcrumed at 61 on a frame member 62 which is shown as having a hub portion 63 in which the rear end of the shaft 42 which drives the threading tool is journaled. This latch is normally held upward into latching position as by the leaf spring 65 secured as at 66 to the frame member 62, and having its free end bearing on the under face of the arm 60. The sleeve 57 rides on a supporting stub shaft 67, the forward end of which also supports the rear end of a latch release member 68 provided with a socket in which the forward end of this shaft 67 rides, the forward end of the latch release sleeve 68 being secured to the right hand end of the rod 23. As shown this rod is threaded into the extremity of the sleeve 68 and is held in position therein as by a lock nut 69. When the latch release sleeve 68 is drawn to the left from the position shown in Figure 2, an inclined cam face 70 thereon riding on an inclined face 71 of the latch block 59 forces the latch away from the sleeve 57 and releases it from the shoulder 58, whereupon the springs 55 move the shifter arm 52 into its high speed driving position. The gears 40 and 41 are driven through gears 72 and 73 (Figures 6 and 7) keyed to a drive shaft 74.

The latch mechanism is controlled by mechanism now to be described. The head 37 which supports the shaft 32 has spaced end flanges 78 and 79 extended on one side to form supporting bearings for the rod 23. On this rod 23 between the portions 78 and 79 is positioned an abutment block 80 between which and the portion 79 reacts a coil spring 81 which tends to hold the block 80 in contact with the part 78, but the rod 23 can be moved in opposition to this spring as far as is permitted by a stop sleeve 82 threaded on its outer end.

Between the rod 23 and the shaft 32 these flanges 78 and 79 carry journaled therein a rock shaft 85 which forms part of the latch mechanism for releasing the rod 23 when it has been moved against the tension of the spring 81 so that this spring can return it to the full line position shown in Figure 1. This rock shaft 85 is provided with a collar 86 provided with a trigger lug 87, which when the block 80 is moved to the dotted line position of Figure 1, may be interposed between it and the member 78 so as to hold the block 80 in its dotted line position, and it is normally urged in this angular position as by means of a coil spring 88 having one end engaged in a collar 89 secured to the rock shaft 85 and its other end engaged in a hole in the member 79. Outwardly of the member 79 the shaft 85 has secured thereto an arm 90 (see Figures 1 and 4), this arm being keyed to the rock shaft and also clamped thereto as by the screw 91. When the rock shaft 85 is in locking position with respect to the rod 23, it is in the dotted line position shown in Figure 4, wherein it may be struck by either of a pair of diametrically oppositely positioned lugs 92 on the collar 28, when the collar 28 is in proper axial position so to do, as shown in Figure 1. When the collar is in this position, further rotation of the shaft 32 to which it is keyed by the pin 30, causes the arm 90 to be moved outwardly into the full line position of Figure 4, thus turning the rock shaft 85 and releasing the block 80 which may be thrown to the full line position shown in Figure 1 by the spring 81. This pulls the sleeve 68 to the left, as viewed in Figure 1, and causes its cam face 70 to release the sleeve 57, whereupon the springs 55 move the clutch 51 to the position of Figure 1 from that shown in Figure 2, unclutching the gear 41 and clutching the gear 40. The drive connections to the shaft 32 are thus changed so as to reverse its direction of motion with relation to the rotation of the work. Since the work is rotating, this reversal of relative direction of rotation is accomplished by changing the speed of rotation of the shaft 32, and thus of the tap, between speeds, one of which is lower than and the other higher than the speed of rotation of the work. The threading tool is thus retracted through its engagement with the work after which the arm 22 is retracted by the cam 14. When the nuts 25 are contacted by the arm 22, further retracting motion of this arm pushes the rod 23 to the right, causing the release sleeve 68 to pass out of releasing position and to press the sleeve 57 and the shifting arm 52 to the position of Figure 2 where the gear 40 has been unclutched and the gear 41 clutched, these parts being there latched by the latch block 59, engaging the latch sleeve face 58. This motion of the rod 23 has also brought the block 80 to the dotted line position of Figure 1 where it is held by the trigger lock 87. The parts are then in position for another cycle of operations.

From the foregoing description of an embodiment of this invention, it should be evident to those skilled in the art that various changes and modifications may be made without departing from the spirit or scope of this invention as defined by the appended claims.

I claim:

1. In combination, means for rotatably supporting a threaded cutting tool with capability of axial motion, mechanism for rotating said supporting means including a pair of driving means and a member movable to select which of said pair of means is in driving relation to said supporting means, means biasing said selecting means to select one of said driving means, a latch for holding said selecting means in position to select the other of said driving means, means biasing said latch to latching position, a latch-release mechanism biased to latch-releasing condition, trigger means for holding said release mechanism out of latch-releasing condition, and means for releasing said trigger means when said supporting means has moved axially to a predetermined point through engagement of the tool with the work.

2. In combination, means for rotatably supporting a threaded cutting tool with capability of axial motion, mechanism for rotating said supporting means including a pair of driving means and a member movable to select which of said pair of means is in driving relation to said supporting means, means biasing said selecting means to select one of said driving means, a latch for holding said selecting means in position to select the other of said driving means, means biasing said latch to latching position, a latch release mechanism biased to latch-releasing condition, trigger means for holding said release mechanism out of latch-releasing condition, means for releasing said trigger means when said supporting means has moved axially to a predetermined point through engagement of the tool with the work, and means for moving said support axially to engage the tool with the work and after said latch means has released said latch to move said latch-release means in position to permit the resetting of said latch.

3. A threading mechanism comprising a pair of telescopically arranged shafts, a threading tool holder carried by one of said shafts, means for preventing relative rotation between said shafts, a pair of means for selectively driving the other of said shafts, means movable lengthwise of said shafts for selecting the driving means, spring means tending to hold said movable means at one of its selecting positions, an axially movable rod arranged substantially parallel to said shafts, a member fixed to said movable means and slidable on said rod and presenting a shoulder, a latch for cooperation with said shoulder to hold said selecting means at the other of its selected positions, a latch-releasing member carried by said rod and arranged to impinge on said shoulder member and return it and said selecting member to the first selective position on movement of said rod in one direction, a member actuable to move said one shaft axially to bring the threading tool up to work to cause engagement of said tool on the work to continue such motion, and means acting when said shaft has been moved to a predetermined extent by such engagement for moving said rod in the other direction causing said latch-releasing member to release said latch and permit said selecting means to be moved to said one selecting position, and means acting thereafter to move said shaft away from the work and said rod in a direction to re-set said member and selecting means to said other selecting position.

CARROLL E. MILLER.